US008065447B2

United States Patent
Ryu et al.

(10) Patent No.: US 8,065,447 B2
(45) Date of Patent: Nov. 22, 2011

(54) METHOD AND APPARATUS FOR DETERMINING PRIORITIES IN DIRECT MEMORY ACCESS DEVICE HAVING MULTIPLE DIRECT MEMORY ACCESS REQUEST BLOCKS

(75) Inventors: Eun-jin Ryu, Seoul (KR); Dong-soo Kang, Hwaseong-si (KR); Jae-young Lim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 93 days.

(21) Appl. No.: 11/896,453

(22) Filed: Aug. 31, 2007

(65) Prior Publication Data

US 2008/0183913 A1 Jul. 31, 2008

(30) Foreign Application Priority Data

Jan. 31, 2007 (KR) .................. 10-2007-0010210

(51) Int. Cl.
*G06F 3/00* (2006.01)
(52) U.S. Cl. ............. 710/22; 710/40; 710/116; 710/123
(58) Field of Classification Search .................. 710/40, 710/116, 25, 123
See application file for complete search history.

(56) References Cited

U.S. PATENT DOCUMENTS

| | | | | |
|---|---|---|---|---|
| 5,450,551 A * | 9/1995 | Amini et al. | ............... | 710/119 |
| 6,006,303 A * | 12/1999 | Barnaby et al. | ............... | 710/244 |
| 6,615,291 B1 * | 9/2003 | Kamei et al. | ............... | 710/22 |
| 6,735,639 B2 * | 5/2004 | Higuchi | ............... | 710/6 |
| 7,080,177 B2 * | 7/2006 | Neuman | ............... | 710/240 |
| 7,299,324 B2 * | 11/2007 | Shrader et al. | ............... | 711/158 |
| 7,777,753 B2 * | 8/2010 | Owen et al. | ............... | 345/541 |
| 2004/0095599 A1 * | 5/2004 | Guddanti | ............... | 358/1.15 |
| 2005/0066093 A1 * | 3/2005 | Fuchikami et al. | ............... | 710/107 |
| 2005/0080942 A1 * | 4/2005 | Ogilvie et al. | ............... | 710/22 |
| 2006/0013566 A1 * | 1/2006 | Nakamura | ............... | 386/97 |
| 2006/0020935 A1 * | 1/2006 | Tran et al. | ............... | 717/162 |
| 2007/0011381 A1 * | 1/2007 | Ishida | ............... | 710/116 |
| 2007/0294446 A1 * | 12/2007 | Nagao et al. | ............... | 710/110 |
| 2008/0065801 A1 * | 3/2008 | Fukuyama et al. | ............... | 710/117 |

FOREIGN PATENT DOCUMENTS

| KR | 2001-0084392 | 9/2001 |
|---|---|---|
| KR | 10-2004-0010957 | 2/2004 |

\* cited by examiner

*Primary Examiner* — Alford Kindred
*Assistant Examiner* — Ernest Unelus
(74) *Attorney, Agent, or Firm* — Staas & Halsey LLP (57) ABSTRACT

A priority determining method and apparatus can reduce a total waiting time of DMA request blocks by granting priority to each of Direct Memory Access (DMA) request blocks transmitting a DMA request signal, based on Data Transfer Amounts (DTAs) of the DMA request blocks and Arrival Times (ATs) of the DMA request signals, counting the number of priority changes of each of DMA request blocks whose priority is changed in the priority granting process, and if a DMA request signal is received from a new DMA request block, determining priorities of the DMA request blocks based on the counted the number of priority changes.

15 Claims, 5 Drawing Sheets

METHOD AND APPARATUS FOR DETERMINING PRIORITIES IN DIRECT MEMORY ACCESS DEVICE HAVING MULTIPLE DIRECT MEMORY ACCESS REQUEST BLOCKS

CROSS-REFERENCE TO RELATED APPLICATIONS

This application claims the benefit of Korean Patent Application No. 10-2007-0010210, filed on Jan. 31, 2007, in the Korean Intellectual Property Office, the disclosure of which is incorporated herein in its entirety by reference.

BACKGROUND

1. Field

The embodiments discussed herein relate to Direct Memory Access (DMA), and more particularly, to a method and apparatus for dynamically determining priorities of DMA request blocks based on Data Transfer Amounts (DTAs).

2. Description of the Related Art

A Direct Memory Access (DMA) method is a data transfer method performed between a memory and a DMA request block without control of a Central Processing Unit (CPU). In order to use the DMA method, a DMA control module must be added to a system bus. The DMA control module processes a portion of functions of the CPU instead of the CPU by receiving a system control right from the CPU. That is, the CPU leaves data transfer to the DMA control module, and DMA control module processes the data transfer instead of the CPU. In this case, the DMA control module directly transmits data to the memory without being controlled by of the CPU, and if all data is completely transmitted, the DMA control module generates an interrupt and transmits the interrupt to the CPU.

In particular, in a DMA control module having a plurality of DMA request blocks, if each DMA request block is an Input/Output (I/O) device, such as a Liquid Crystal Display (LCD), only data transfer is the purpose of the DMA control module, and fixed priorities of the I/O devices are typically set in advance. Thus, if a DMA request is input from an I/O device having higher priority during data transfer between a memory and an I/O device having lower priority, the DMA control module stops the data transfer between the memory and the I/O device having lower priority, stores information on data transmitted till the moment in a temporary buffer, and processes data transfer between the memory and the I/O device having higher priority. If the data transfer between the memory and the I/O device having higher priority ends, the DMA control module resumes the data transfer between the memory and the I/O device having lower priority based on the information stored in the temporary buffer.

However, in a Multiprocessor System on Chip (MPSoC) environment in which DMA request blocks including one or more programmable processors, e.g. a Digital Signal Processor (DSP), an audio processor, and/or a video processor, are contained, a large amount of data transfer is necessary, and thus, a temporary buffer with large capacity is needed to store information on data transmitted till the moment. However, it is not preferable in terms of cost to add an additional buffer. Thus, in the MPSoC environment, it is not preferable to set fixed priorities as in the case of the I/O devices.

SUMMARY

Additional aspects and/or advantages will be set forth in part in the description which follows and, in part, will be apparent from the description, or may be learned by practice of the invention.

An aspect of the embodiments provides a method and apparatus for determining priorities of Direct Memory Access (DMA) request blocks based on Data Transfer Amounts (DTAs) or Arrival Times (ATs) of DMA request signals.

The embodiments also provides a computer readable recording medium storing a computer readable program for executing a method of determining priorities of DMA request blocks based on DTAs or ATs of DMA request signals.

According to an aspect of the embodiments, there is provided a priority determining method including: granting priority to each of DMA request blocks transmitting a DMA request signal, based on DTAs of the DMA request blocks and ATs of the DMA request signals; counting the number of priority changes of each of DMA request blocks whose priority is changed in the granting priority; and if a DMA request signal is received from a new DMA request block, determining priorities of the DMA request blocks based on the counted numbers of priority changes.

According to another aspect of the embodiments, there is provided a computer readable recording medium storing a computer readable program for executing the priority determining method.

According to an aspect of the embodiments, there is provided a priority determining apparatus including: a priority pre-processing unit granting priority to each of DMA request blocks transmitting a DMA request signal, based on DTAs of the DMA request blocks and ATs of the DMA request signals; a counter counting the number of priority changes of each of DMA request blocks whose priority is changed in the priority granting process; and a priority determining module determining priorities of the DMA request blocks based on the counted numbers when a DMA request signal is received from a new DMA request block.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Reference will now be made in detail to the embodiments, examples of which are illustrated in the accompanying drawings, wherein like reference numerals refer to the like elements throughout. The embodiments are described below to explain the embodiments by referring to the figures.

Hereinafter, a method and apparatus for determining priorities in a Direct Memory Access (DMA) device having a plurality of DMA request blocks will be described in detail by explaining embodiments with reference to the attached drawings. Like reference numerals in the drawings denote like elements. In the following description, although many specific items, such as components of a concrete circuit, are shown, they are only provided to help general understanding of the embodiments, and it will be understood by those of ordinary skill in the art that one or more embodiments of the embodiments can be implemented without these specific items. In the following description, well-known functions or constructions are not described in detail since they would obscure the embodiments with unnecessary detail.

Figure 1:
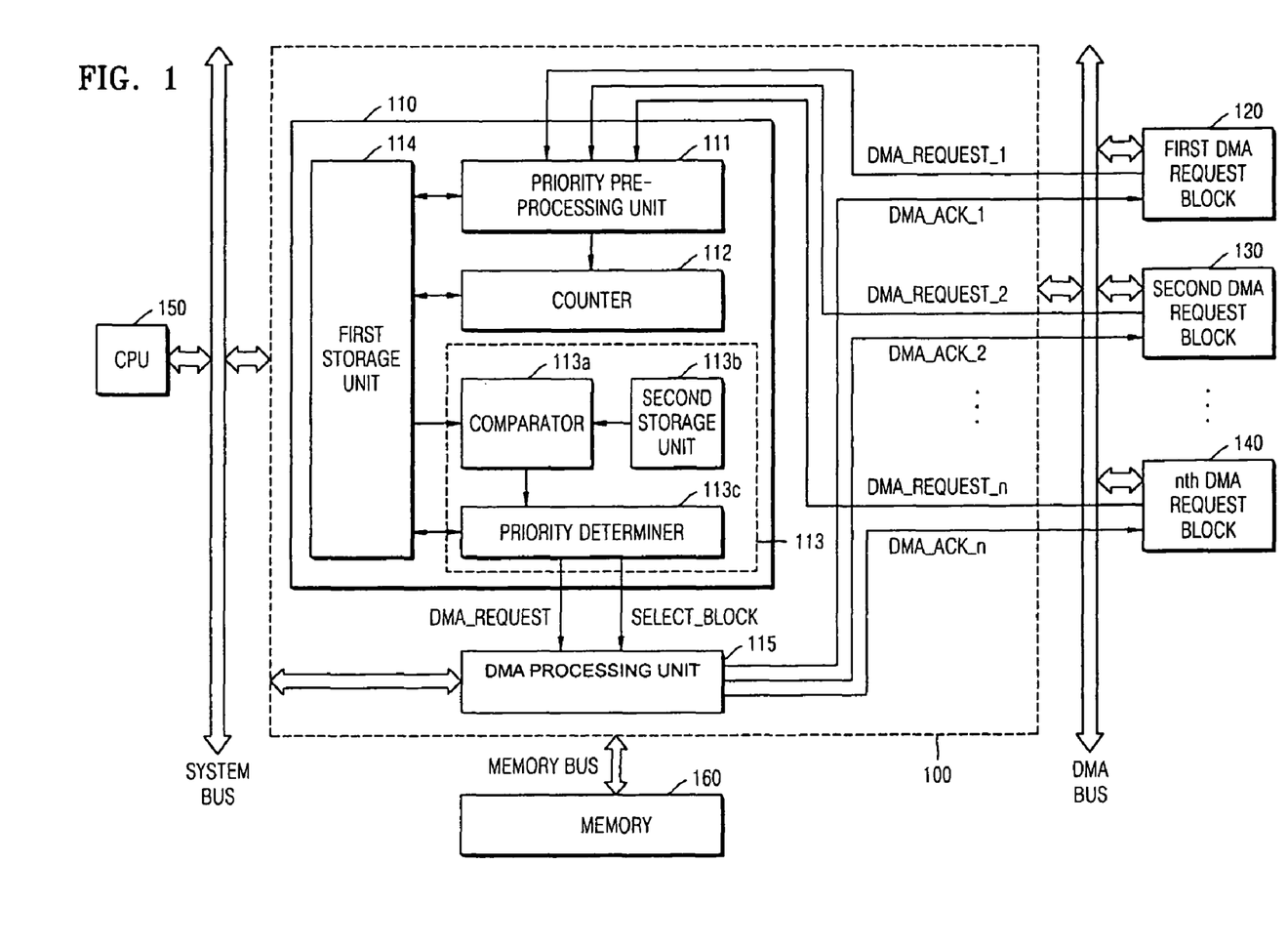
FIG. 1 illustrates a Direct Memory Access (DMA) control module, which includes a priority determining apparatus, and associated devices according to an embodiment.
Figure 2A:
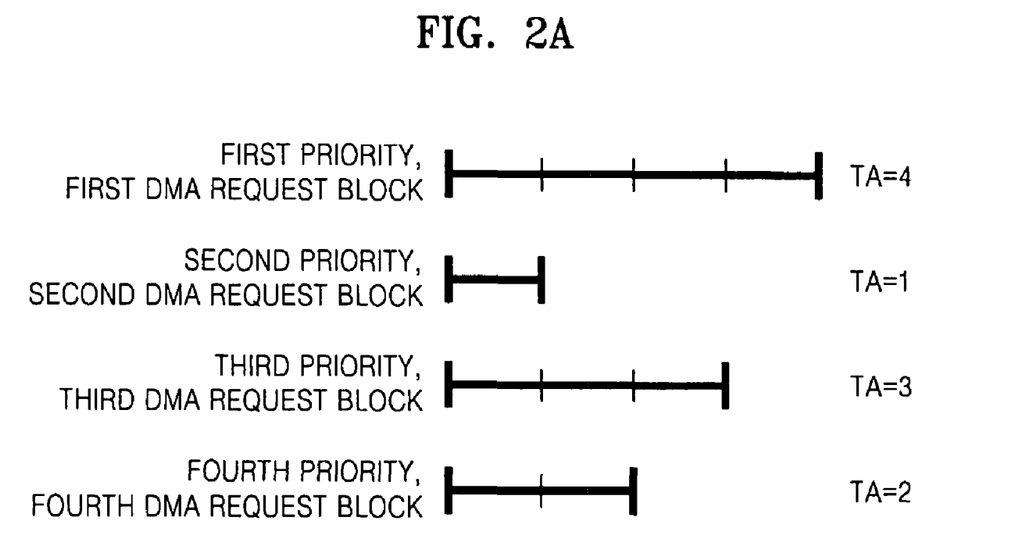
FIG. 2A illustrates priorities determined according to Arrival Times (ATs) of DMA request signals.
Figure 2B:
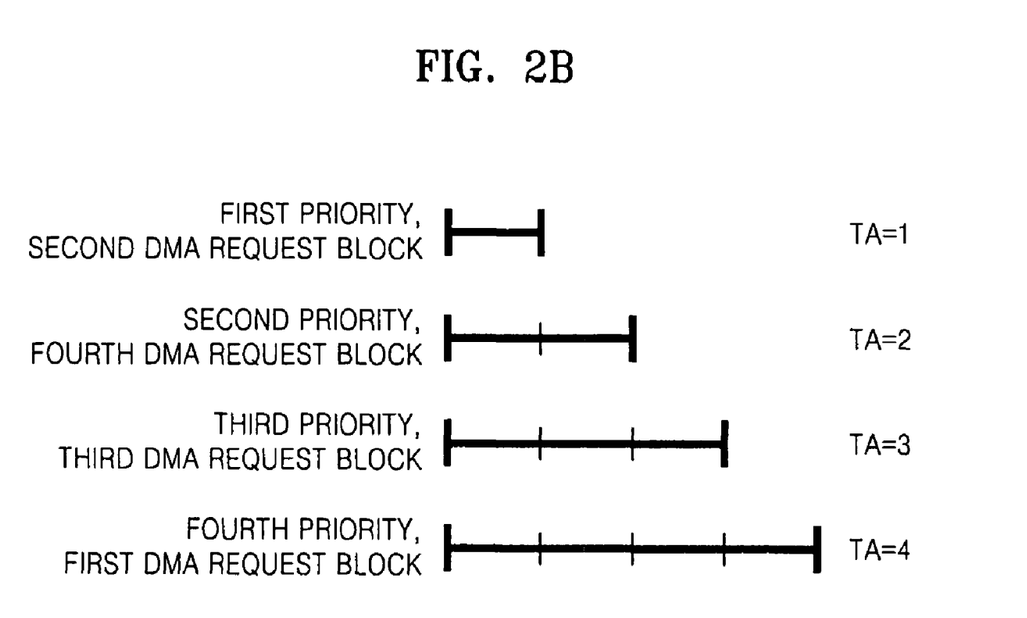
FIG. 2B shows priorities determined based on Data Transfer Amounts (DTAs)
Figure 3A:
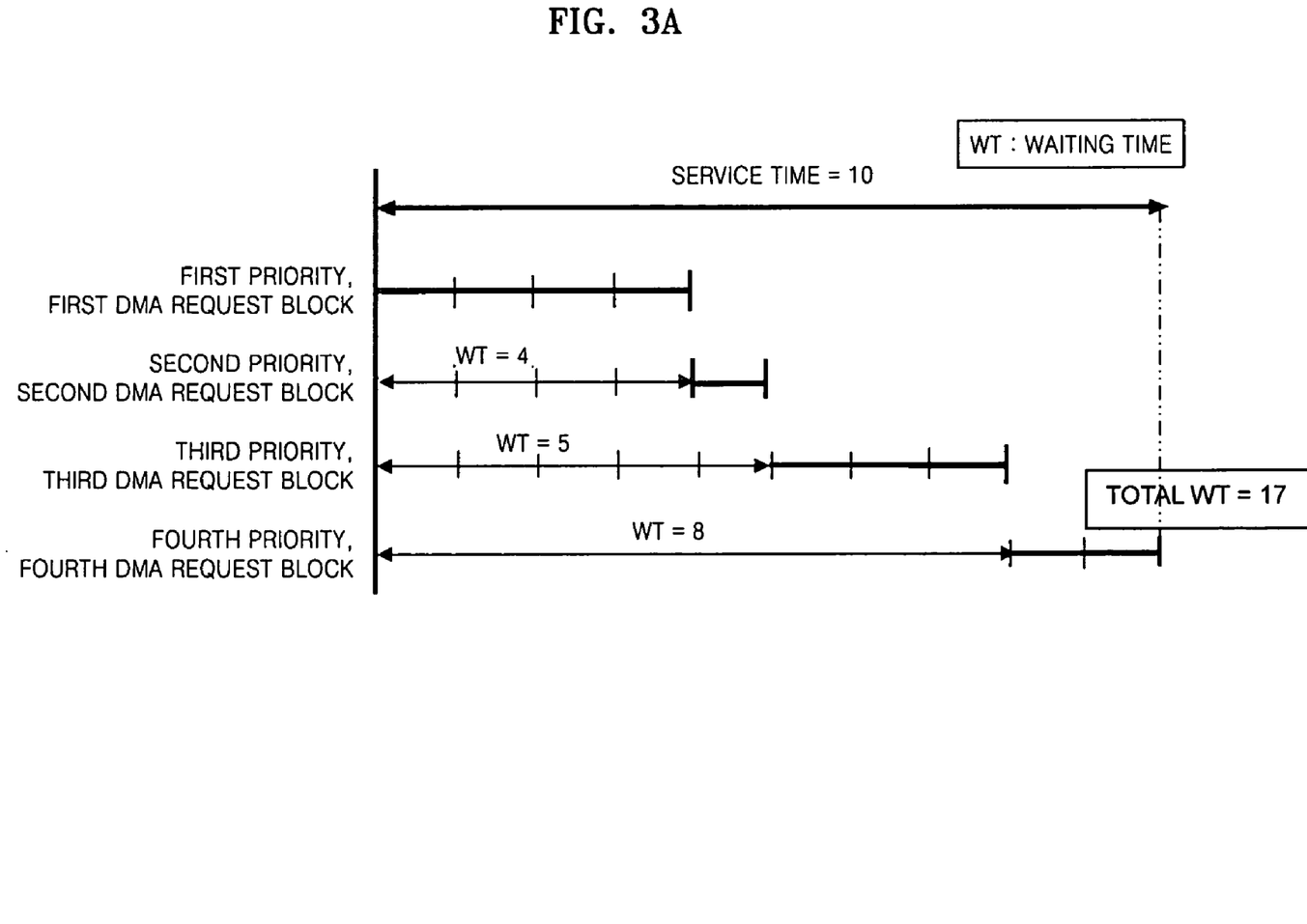
FIG. 3A illustrates each Waiting Time (WT) required when DMA is performed according to the priorities determined in FIG. 2A.
Figure 3B:
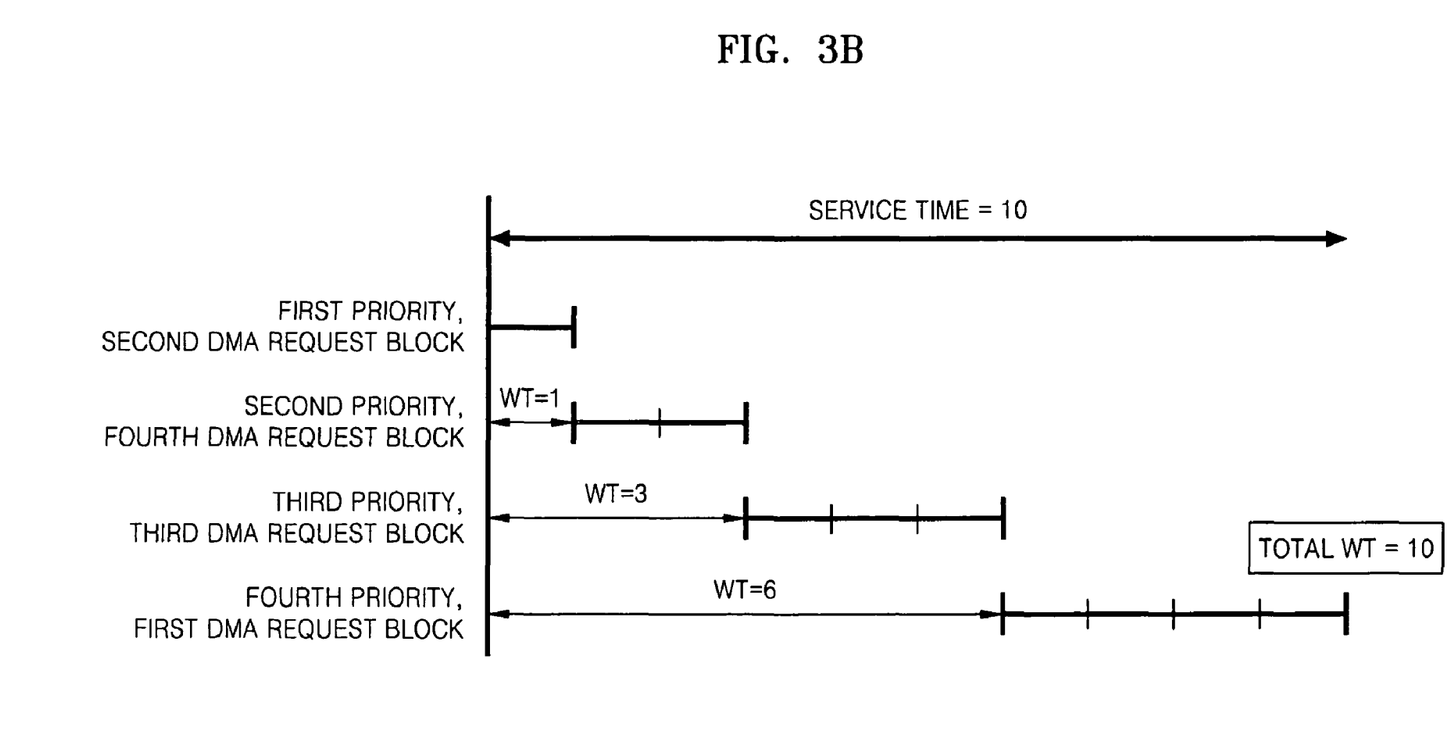
FIG. 3B shows each WT required when DMA is performed according to the priorities determined in FIG. 2B.

FIG. 1 illustrates a block diagram of a Direct Memory Access (DMA) control module 100, which includes a priority determining apparatus 110, and associated devices according to an embodiment of the embodiments. FIG. 2A illustrates priorities determined according to Arrival Times (ATs) of DMA request signals, and FIG. 2B illustrates priorities determined based on Data Transfer Amounts (DTAs). FIG. 3A illustrates each Waiting Time (WT) required when DMA is performed according to the priorities determined in FIG. 2A, and FIG. 3B illustrates each WT required when DMA is performed according to the priorities determined in FIG. 2B. FIGS. 2A through 3B will be described together when associated components illustrated in FIG. 1 are described.

A general data transfer process using a DMA method will now be described with reference to FIG. 1.

A first DMA request block 120, a second DMA request block 130, and an $n^{th}$ DMA request block 140 transmit DMA request signals DMA_REQUEST_1, DMA_REQUEST_2, and DMA_REQUEST_n to the DMA control module 100 via a DMA bus, respectively. Each DMA request signal includes a DTA of a corresponding DMA request block.

The priority determining apparatus 110 of the DMA control module 100, which has received the DMA request signals, determines priorities of the DMA request blocks 120, 130, and 140 based on the DTAs and transmits a signal SELECT_BLOCK of a DMA request block selected according to the determined priorities and a corresponding DMA request signal DMA_REQUEST to a DMA processing unit 115.

The DMA processing unit 115 receives the signals SELECT_BLOCK and DMA_REQUEST and controls data transfer between the selected DMA request block and a memory 160. In this case, the selected DMA request block receives one of DMA_ACK_1 through to DMA_ACK_n.

If the data transfer between the selected DMA request block and the memory 160 is completed, the DMA control module 100 generates an interrupt and transmits the interrupt to a Central Processing Unit (CPU) 150.

Blocks of the priority determining apparatus 110 according to an embodiment of the embodiments will now be described in detail. The priority determining apparatus 110 includes a priority pre-processing unit 111, a counter 112, a priority determining module 113, and a first storage unit 114, wherein the priority determining module 113 includes a comparator 113a, a second storage unit 113b, and a priority determiner 113c.

The priority pre-processing unit 111 grants priority to the first DMA request block 120, which has transmitted the DMA request signal DMA_REQUEST_1, based on DTAs in association with the second DMA request block 130 and the $n^{th}$ DMA request block 140 and stores the granted priority in the first storage unit 114. The priority pre-processing unit 111 grants higher priority to a DMA request block having a small DTA.

The counter 112 counts the number of priority changes of each of DMA request blocks whose priority is changed in the priority granting process performed by the priority pre-processing unit 111 and stores the counted numbers in the first storage unit 114.

The priority grant operation will now be described with reference to FIGS. 2A through 3B.

FIG. 2A illustrates priorities determined according to ATs of DMA request signals, and FIG. 2B illustrates priorities determined based on DTAs. Two methods of granting priorities can be considered. The first method is a static method. The static method is a method in which priority granted once is not changed, e.g., a method of granting priorities to DMA request blocks according to ATs of corresponding DMA request signals. The second method is a dynamic method. The dynamic method is a method in which priorities of existing DMA request blocks are changed according to a DMA request of a new DMA request block, e.g., a method of granting priorities to DMA request blocks based on DTAs. The ATs or DTAs are only illustrations of the static method or the dynamic method.

In FIGS. 2A and 2B, it is assumed that the number of DMA request blocks is 4, ATs of DMA request signals are in the order from the first DMA request block 120 to the fourth DMA request block, a DTA of the first DMA request block 120 is 4, a DTA of the second DMA request block 130 is 1, a DTA of the third DMA request block is 3, and a DTA of the fourth DMA request block is 2.

Referring to FIG. 2A with the assumption, when priorities are granted based on the ATs of the DMA request signals, higher priority is granted in the order of the first DMA request block 120, the second DMA request block 130, the third DMA request block, and the fourth DMA request block.

Referring to FIG. 2B with the assumption, when priorities are granted based on the DTAs, higher priority is granted in the order of the second DMA request block 130, the fourth DMA request block, the third DMA request block, and the first DMA request block 120.

FIG. 3A illustrates each WT required when DMA is performed according to the priorities determined in FIG. 2A, and FIG. 3B shows each WT required when DMA is performed according to the priorities determined in FIG. 2B. Each WT is the time each DMA request block must wait for data transfer based on priority.

Referring to FIG. 3A, if data transfer is performed according to the priorities granted based on the ATs of the DMA request signals, a total WT is 17 by adding a WT of the second DMA request block 130, i.e. 4, a WT of the third DMA request block, i.e. 5, and a WT of the fourth DMA request block, i.e. 8.

Referring to FIG. 3B, if data transfer is performed according to the priorities granted based on the DTAs, a total WT is 10 by adding a WT of the fourth DMA request block, i.e. 1, a WT of the third DMA request block, i.e. 3, and a WT of the first DMA request block 120, i.e. 6.

Thus, although a service time taken to transmit a total of the DTAs of the DMA request blocks is 10 for the both cases illustrated in FIGS. 3A and 3B, if the WTs of the DMA request blocks are considered, the dynamic method based on DTAs can reduce a total WT.

A process of granting priority and counting the number of priority changes according to an aspect of the embodiments will now be described.

For example, if it is assumed that the DMA request signal DMA_REQUEST_1 from the first DMA request block 120 arrives first and a DTA of the first DMA request block 120 is 4, (AT of DMA request signal, DTA, number of priority changes, priority) of the first DMA request block 120 is (1, 4, 0, 1). If a DTA of the second DMA request block 130 whose DMA request signal DMA_REQUEST_2 arrives next is 1, (AT of DMA request signal, DTA, number of priority changes, priority) of the second DMA request block 130 is (2, 1, 0, 1), and (AT of DMA request signal, DTA, number of priority changes, priority) of the first DMA request block 120 is changed to (1, 4, 1, 2) due to the second DMA request block 130. That is, when priority is granted based on DTAs, the priority of the first DMA request block 120 becomes lower from 1 to 2, and the number of priority changes becomes 1.

Likewise, if a DTA of the third DMA request block whose DMA request signal arrives next to the DMA request signal DMA_REQUEST_2 of the second DMA request block 130 is 3, (AT of DMA request signal, DTA, number of priority changes, priority) of the third DMA request block is (3, 3, 0, 2), and (AT of DMA request signal, DTA, number of priority changes, priority) of the first DMA request block 120 and the second DMA request block 130 is changed to (1, 4, 2, 3) and (2, 1, 0, 1), respectively. (AT of DMA request signal, DTA, number of priority changes, priority) of each DMA request block is stored in the first storage unit 114 in the form of Table 1.

TABLE 1

| Priority | AT | DMA request block | DTA | Number of priority changes |
|---|---|---|---|---|
| 3 | 1 | 1 | 4 | 2 |
| 1 | 2 | 2 | 1 | 0 |
| 2 | 3 | 3 | 3 | 0 |

The reason why the number of priority changes is counted is to prevent starvation occurring when priorities are granted based on DTAs. The starvation indicates a state in which a process having lower priority cannot be performed due to a process having higher priority. In the current embodiment, since the priority of the first DMA request block 120 becomes lower due to the second and third DMA request blocks, the first DMA request block 120 may not transmit data in the worst case. Thus, in the current embodiment, the number of priority changes of each DMA request block is counted, and priority may be maintained based on the counted number.

The comparator 113a compares the number of priority changes of each DMA request block, which is stored in the first storage unit 114, and a predetermined threshold stored in advance in the second storage unit 113b and transmits the comparison result to the priority determiner 113c.

The priority determiner 113c finally determines priorities of existing DMA request blocks and a new DMA request block according to the comparison result received from the comparator 113a and stores the priorities in the first storage unit 114.

The first storage unit 114 stores the priorities finally determined by the priority determiner 113c in the form of Tables 2 and 3.

According to an embodiment of the embodiments, if the number of priority changes of one of existing DMA request blocks whose priority has been changed is equal to or greater than a predetermined threshold, the priority determiner 113c maintains priorities of all existing DMA request blocks as they are and determines priority of a new DMA request block based on an AT of its DMA request signal.

In association with Table 1, it is assumed that the predetermined threshold is 2 and the DMA request signal of the fourth DMA request block whose DTA is 2 arrives after the DMA request signal of the third DMA request block arrives. Then, (AT of DMA request signal, DTA, number of priority changes, priority) of the first DMA request block 120 through the fourth DMA request block, which are finally determined according to the first embodiment of the present invention, are shown in Table 2.

That is, when the DMA request signal of the fourth DMA request block, which is the new DMA request block, arrives, since the number of priority changes of the first DMA request block 120 among the existing DMA request blocks is 2, priority of the fourth DMA request block becomes 4 according to an AT of the DMA request signal of the fourth DMA request block, and the priorities of the existing DMA request blocks are maintained without change.

TABLE 2

| Priority | AT | DMA request block | DTA | Number of priority changes |
|---|---|---|---|---|
| 3 | 1 | 1 | 4 | 2 |
| 1 | 2 | 2 | 1 | 0 |
| 2 | 3 | 3 | 3 | 0 |
| 4 | 4 | 4 | 2 | 0 |

According to another embodiment of the embodiments, if the number of priority changes of one of existing DMA request blocks whose priority has been changed is equal to or greater than a predetermined threshold, the priority determiner 113c maintains priority of the DMA request block whose number of priority changes is equal to or greater than the predetermined threshold as it is and determines priorities of the other DMA request blocks based on DTAs.

In association with Table 1, it is assumed that the predetermined threshold is 2 and the DMA request signal of the fourth DMA request block whose DTA is 2 arrives after the DMA request signal of the third DMA request block arrives. Then, (AT of DMA request signal, DTA, number of priority changes, priority) of the first DMA request block 120 through the fourth DMA request block, which are finally determined according to the second embodiment of the present invention, are shown in Table 3.

That is, when the DMA request signal of the fourth DMA request block, which is the new DMA request block, arrives, since the number of priority changes of the first DMA request block 120 among the existing DMA request blocks is 2, the priority of the first DMA request block 120 is maintained as 3, and the priorities of the second through fourth DMA request blocks are determined based on DTAs.

TABLE 3

| Priority | AT | DMA request block | DTA | Number of priority changes |
|---|---|---|---|---|
| 3 | 1 | 1 | 4 | 2 |
| 1 | 2 | 2 | 1 | 0 |
| 4 | 3 | 3 | 3 | 1 |
| 2 | 4 | 4 | 2 | 0 |

Figure 4:
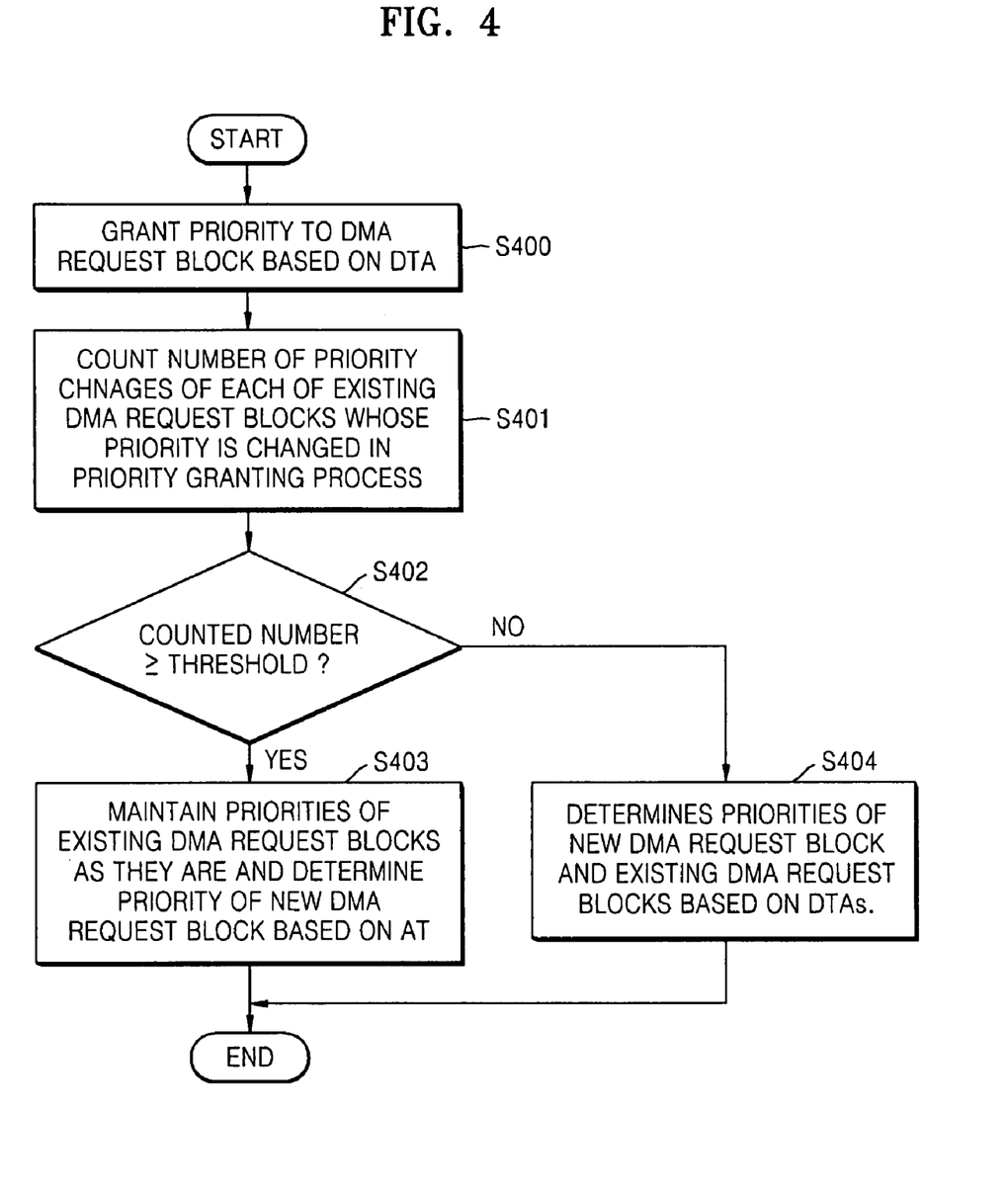
FIG. 4 illustrates of a priority determining method according to an embodiment.

FIG. 4 is a flowchart of a priority determining method according to an embodiment of the present invention.

Referring to FIG. 4, in operation S400, the priority preprocessing unit 111 grants priority to a new DMA request block sending a DMA request signal, based on DTAs in association with existing DMA request blocks.

When a DMA request block transmits a DMA request signal to the priority determining apparatus 110, the DMA request block also transmits information on a DTA, and the DMA request block is a programmable processor such as a Digital Signal Processor (DSP), an audio processor, or a video processor. Higher priority is granted to a DMA request block having a small DTA.

In operation S401, the counter 112 counts the number of priority changes of each of existing DMA request blocks whose priority is changed in the priority granting process of operation S400.

In operation S402, the comparator 113a compares the number of priority changes of each existing DMA request block and a predetermined threshold. The predetermined threshold can be arbitrary changed.

If the number of priority changes of one of the existing DMA request blocks is equal to or greater than the predetermined threshold as a result of the comparison of operation S402, the priority determiner 113c maintains priorities of all existing DMA request blocks as they are and determines priority of a new DMA request block based on an AT of DMA request signal the new DMA request block.

Alternatively, if the number of priority changes of one of the existing DMA request blocks is equal to or greater than the predetermined threshold as a result of the comparison of operation S402, the priority determiner 113c maintains the priority of the DMA request block whose number of priority changes is equal to or greater than the predetermined threshold as it is and determines priorities of the other DMA request blocks based on DTAs.

If the number of priority changes of one of the existing DMA request blocks is less than the predetermined threshold as a result of the comparison of operation S402, the priority determiner 113c determines priorities of the new DMA request block and the existing DMA request blocks based on DTAs. For example, if the predetermined threshold is set to 4, the priority list of Table 1 is updated. Thereafter, data transfer starts according to the determined priority list.

An aspect of the embodiments can also be embodied as computer readable codes on a non-transitory computer readable recording medium. The non-transitory computer readable recording medium is any data storage device that can store data which can be thereafter read by a computer system. Examples of the non-transitory computer readable recording medium include read-only memory (ROM), random-access memory (RAM), CD-ROMs, magnetic tapes, floppy disks, and optical data storage devices. The non-transitory computer readable recording medium can also be distributed over network coupled computer systems so that the computer readable code is stored and executed in a distributed fashion.

As described above, according to the embodiments, by counting the number of priority changes of each of existing DMA request blocks whose number of priority changes is changed according to a DMA request signal of a new DMA request block based on DTAs and maintaining existing priorities if the counted number is equal to or greater than a predetermined threshold, starvation can be prevented. The starvation indicates a state in which a process having lower priority cannot be performed due to a process having higher priority.

In addition, by dynamically determining priorities of DMA request blocks based on DTAs, a total WT of the DMA request blocks can be reduced, resulting in efficient data transmission in general.

While one or more embodiments have been particularly shown and described with reference to the one or more embodiments thereof, it will be understood by those skilled in the art that various changes in form and details may be made therein without departing from the spirit and scope of the embodiments as defined by the appended claims. The one or more embodiments should be considered in descriptive sense only and not for purposes of limitation. Therefore, the scope of the embodiments is defined not by the detailed description of the embodiments but by the appended claims, and all differences within the scope will be construed as being included in the embodiments.

What is claimed is:

1. A priority determining method, comprising:
   granting priority to each of Direct Memory Access (DMA) request blocks transmitting a DMA request signal, based on Data Transfer Amounts (DTAs) of the DMA request blocks and Arrival Times (ATs) of the DMA request signals;
   counting the number of times the granted priority is changed for each of the DMA request blocks whose granted priority is changed in the granting priority; and
   if a DMA request signal is received from a new DMA request block, determining priorities of the DMA request blocks based on at least one of the DTAs and ATs considering the counted number of times the granted priority has changed for each of the DMA request blocks whose priority is changed,
   wherein an arrival order of DMA request blocks is determined based on the ATs, and the priorities of the DMA request blocks are determined using the arrival order to reduce a total Waiting Time (WT),
   wherein the determining priorities of the DMA request blocks comprises:
      comparing the counted number of times the granted priority has changed for each of the DMA request blocks whose priority is changed, with a predetermined count threshold; and
      determining priorities of the DMA request blocks and the new DMA request block based on at least one of the DTAs and ATs of the DMA request signals according to a result of the comparison.

2. The priority determining method of claim 1, wherein if the counted number of priority changes of one of the DMA request blocks whose priority is changed is equal to or greater than the predetermined count threshold in the determining priorities, the priorities of the DMA request blocks are maintained as the priorities, and priority of the new DMA request block is determined based on an AT of its DMA request signal.

3. The priority determining method of claim 1, wherein if the counted number of priority changes of one of the DMA request blocks whose priority is changed is equal to or greater than the predetermined count threshold in the determining priorities, the priority of the DMA request block whose counted number of priority changes is equal to or greater than the predetermined count threshold among the DMA request blocks is maintained as it is and priorities of the new DMA request block and the other DMA request blocks remaining by excluding the DMA request block maintaining its existing priority are determined based on DTAs.

4. The priority determining method of claim 1, wherein the granting priority comprises granting higher priority to a DMA request block having a smaller DTA.

5. The priority determining method of claim 1, wherein the new DMA request block and the DMA request blocks are processors which can perform data computation.

6. The priority determining method of claim 1, wherein the predetermined count threshold can be changed.

7. A non-transitory computer readable recording medium storing a computer readable program for executing the priority determining method of claim 1.

8. A priority determining apparatus, comprising:
a priority pre-processing unit to grant priority to each of Direct Memory Access (DMA) request blocks transmitting a DMA request signal, based on Data Transfer Amounts (DTAs) of the DMA request blocks and Arrival Times (ATs) of the DMA request signals;
a counter to count the number of times the granted priority is changed for each of the DMA request blocks whose priority is changed in the priority granting process; and
a priority determining module to determine priorities of the DMA request blocks based on at least one of the DTAs and ATs considering the counted number of times the granted priority has changed for each of the DMA request blocks whose priority is changed, when a DMA request signal is received from a new DMA request block,
wherein an arrival order of DMA request blocks is determined based on the ATs, and the priorities of the DMA request blocks are determined using the arrival order to reduce a total Waiting Time (WT), and
wherein the priority determining module comprises:
a comparator to compare the counted number of times the granted priority has changed for each of the DMA request blocks whose priority is changed, with a predetermined count threshold; and
a priority determiner to determine priorities of the DMA request blocks and the new DMA request block based on at least one of the DTAs and ATs of the DMA request signals according to a result of the comparison.

9. The priority determining apparatus of claim 8, wherein if the counted number of priority changes of one of the DMA request blocks whose priority is changed is equal to or greater than the predetermined count threshold, the priority determiner maintains the priorities of the DMA request blocks as the priorities and determines priority of the new DMA request block based on an AT of its DMA request signal.

10. The priority determining apparatus of claim 8, wherein if the counted number of priority changes of one of the DMA request blocks whose priority is changed is equal to or greater than the predetermined count threshold, the priority determiner maintains the priority of the DMA request block whose counted number of priority changes is equal to or greater than the predetermined count threshold among the DMA request blocks as it is and determines priorities of the new DMA request block and the other DMA request blocks remaining by excluding the DMA request block maintaining its existing priority based on DTAs.

11. The priority determining apparatus of claim 8, wherein the priority pre-processing unit grants higher priority to a DMA request block having a smaller DTA.

12. The priority determining apparatus of claim 8, wherein the new DMA request block and the DMA request blocks are processors which can perform data computation.

13. The priority determining apparatus of claim 8, wherein the predetermined count threshold can be changed.

14. A priority determining method, comprising:
granting priority to each of Direct Memory Access (DMA) request blocks; and
transmitting a DMA request signal, based on Data Transfer Amounts (DTAs) of the DMA request blocks, and Arrival Times (ATs) considering a number of times a granted priority is changed for each of the DMA request blocks,
wherein an arrival order of DMA request blocks is determined based on the ATs, and priorities of the DMA request blocks are determined using the arrival order to reduce a total Waiting Time (WT),
wherein the transmitting a DMA request signal comprises:
comparing the number of times the granted priority has changed for each of the DMA request blocks, with a predetermined count threshold; and
transmitting a DMA request signal, based on the DTAs of the DMA request blocks and the ATs, according to a result of the comparison.

15. The priority determining method of claim 14, wherein the granting priority comprises granting higher priority to a DMA request block having a smaller DTA.

* * * * *